Nov. 15, 1955    H. L. MERCER    2,723,931
GLASS ROLLING APPARATUS
Filed July 31, 1953
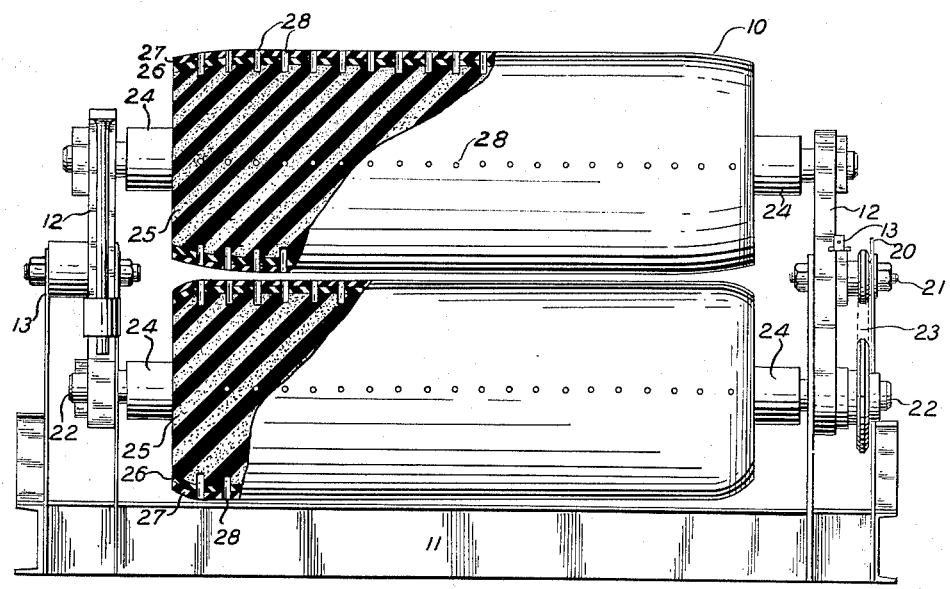
H. L. MERCER
INVENTOR.
BY E. C. McRae
J. R. Faulkner
L. H. Oster
ATTORNEYS

United States Patent Office 2,723,931
Patented Nov. 15, 1955

2,723,931

GLASS ROLLING APPARATUS

Harold L. Mercer, Wyandotte, Mich., assignor to Ford Motor Company, Dearborn, Mich., a corporation of Delaware Application July 31, 1953, Serial No. 371,559

5 Claims. (Cl. 154—2.7)

This invention is concerned with the production of laminated safety glass and more particularly with an apparatus for rolling such laminated safety glass for the purpose of deaerating and prepressing. This invention is related to and an improvement over the invention described in co-pending application Serial No. 263,158, filed December 26, 1951 by Joseph Drozdowski and entitled "Glass Rolling Apparatus," now Patent No. 2,685,548.

In the conventional production of laminated safety glass, a lamina of a vinyl type plastic is inserted between two sheets of ordinary window or plate glass to prevent the generation of lethal edges and fragments of glass in the event of an accident to the motor vehicle in which such glass has been incorporated. This raw sandwich is conventionally warmed slightly and then subjected to pressure by rolling or otherwise to eliminate air from the structure. This deaerated sandwich is then heated to 150–170° F. to render the vinyl plastic tacky and again subjected to pressure, usually by rolling to cause the glass layers to adhere to the plastic. This glass is said to be prepressed and is now ready for immersion in the heated oil of the autoclave to complete the operation and render the sandwich transparent.

The above outlined steps are comparatively simple when the glass is perfectly flat. However in recent years the demand has arisen for curved, laminated glass, particularly for windshield construction. The processes and equipment usable for deaerating and prepressing flat glass are utterly useless insofar as curved glass is concerned. The instant invention has been developed to provide a method and apparatus for quickly and economically deaerating and prepressing large numbers of curved laminated sandwiches. The apparatus described below is capable of being readily incorporated into existing glass production facilities and will rapidly roll curved sandwiches with a minimum of labor and breakage.

The invention to be described herein is particularly concerned with the construction of the rubber rolls in which curved laminated glass sandwiches are deaerated and prepressed. This invention is probably best understood from a study of the drawing which is an elevation, partially in section of a pair of rolls particularly adapted for rolling curved laminated glass.

The preferred rolls for deaerating and prepressing curved glass sandwiches comprise an upper floating roll 10 and a lower driven roll 11 journalled for rotation in side members 12. Side members 12 are in turn journalled for rotation in trunnions 13. Trunnions 13 are located intermediate the axes of upper floating roll 10 and lower driven roll 11. Lower roll 11 is driven through sprocket 20 which is mounted on stub shaft 21. This sprocket 20 and stub shaft 21 are arranged to be chain driven from any convenient source of motion (not shown). Shaft 22 which is coaxial with lower driven roll 11 is driven by a chain 23. Upper floating roll 10 is driven only frictionally by contact with lower driven roll 11. If desired the journals supporting upper floating roll 10 may be slideably mounted in side members 12 so that gravity alone is effective to maintain this roll in contact with the lower roll.

It has been found in practice that these rolls are often destructive to the very fragile glass sandwiches. It has further been found in practice that the breakage of glass in the rolling operations can be substantially reduced if the rolls are constructed as described herein. These rolls are each about thirty-three inches in length and have a diameter of twelve inches. These rolls each comprise a central supporting steel shaft which extends the entire length of the rolls and provides the main structural support. Surrounding shaft 24 is a layer 25 of soft, porous sponge rubber about three inches thick. Superimposed upon layer 25 of sponge rubber is a layer 26 of much harder rubber about one inch thick having a durometer reading ranging from 25 to 35 and preferably about 30. Still another and working layer 27 of a still harder rubber, about one inch thick surrounds the intermediate layer 25. This outside of working layer has a durometer reading of 35 to 45 and preferably 40. To prevent difficulties arising from the compression of the rubber at the ends of the rolls, a radius is provided on each roll. It will be noted that the relief radius provided on driven roll 11 is much smaller than that provided on floating roll 10. It has further been found that a more satisfactory glass rolling operation is accomplished if the upper floating roll 10 is crowned to an extent of about three-sixteenths of an inch. Among other functions, this crown helps roll effectively the central portion of the glass which usually has a slight sag inherent in the bending process.

In the operation of this apparatus, trouble has been encountered due to the premature rupture of the bond between the several layers of rubber of differing hardness. Soft, porous sponge rubber core 25 has been found particularly prone to separate from the harder outer layer 26 to which it is vulcanized. To circumvent this trouble, the rolls have been provided with radial holes of the order of one eighth to one thirty second of an inch in diameter extending from the surface of the roll inwardly at least to the innermost interface between the layers of rubber of differing hardness. In the drawings these holes have been designated 28 and are preferably spaced on about three inch centers. Considerable experience with rolls so perforated has demonstrated an almost complete elimination of the previously frequent interlamellar separation.

It has been found to improve the action of the rolls if one or both and preferably the upper floating roll 10 be provided with grooves about one-quarter inch wide, three-eighths of an inch deep and uniformly spaced about one-and-one-half inches apart along the length of the roll.

It is to be understood that the term "rubber" as used herein is to include elastomers generally, regardless of origin.

I claim as my invention:

1. A glass rolling apparatus comprising a central metal shaft surrounded by a thick layer of soft porous rubber which in turn is surrounded by two, much thinner layers of rubber of greater hardness than the central porous rubber, said rolls being provided with radial perforations extending from the surface of the roll entirely through the two outer hard rubber layers and a significant distance into the soft porous rubber.

2. A glass rolling apparatus comprising a driven lower roll and a floating upper roll, each of said rolls comprising a central metal shaft surrounded by a thick layer of soft, porous sponge rubber, which in turn is surrounded by a much thinner layer of rubber having a durometer of 25 to 35 and an outer working layer of rubber having a durometer of 35 to 45, said rolls being provided with radial perforations extending from the surface of the roll through the two outer rubber layers and a significant distance into the soft porous sponge rubber.

3. A glass rolling apparatus comprising a driven lower roll and a floating upper roll, each of said rolls comprising a central metal shaft surrounded by a thick layer of soft, porous sponge rubber, which in turn is surrounded by a much thinner layer of rubber having a durometer of 25 to 35 and an outer working layer of rubber having a durometer of 35 to 45, the upper floating roll being slightly crowned and at least one of said rolls being provided with radial perforations extending from the surface of the roll through the two outer rubber layers and a significant distance into the soft, porous sponge rubber.

4. A glass rolling apparatus comprising a driven lower roll and a floating upper roll, each of said rolls comprising a central metal shaft surrounded by a thick layer of soft, porous sponge rubber, which in turn is surrounded by a much thinner layer of rubber having a durometer of 25 to 35 and an outer working layer of rubber having a durometer of 35 to 45, said rolls being provided with radial perforations extending from the surface of the roll at least in to the innermost interface between the rubber layers.

5. A glass rolling apparatus comprising a driven lower roll and a floating upper roll, each of said rolls comprising a central metal shaft surrounded by a thick layer of soft, porous sponge rubber, which in turn is surrounded by a much thinner layer of rubber having a durometer of 25 to 35 and an outer working layer of rubber having a durometer of 35 to 45, the upper floating roll being slightly crowned and at least one of said rolls being provided with radial perforations extending from the surface of the roll at least in to the innermost interface between the rubber layers.

References Cited in the file of this patent
UNITED STATES PATENTS

| | | |
|---|---|---|
| 2,191,144 | Hornbostel | Feb. 20, 1940 |
| 2,288,675 | Berry | July 7, 1942 |